US 9,725,071 B2

(12) United States Patent
Miller (10) Patent No.: US 9,725,071 B2
(45) Date of Patent: Aug. 8, 2017

(54) KEY FOB BUTTON SEQUENCE FOR ACCESSING KEYPAD REPROGRAMMING MODE

(71) Applicant: Ford Global Technologies, LLC, Dearborn, MI (US)

(72) Inventor: Robert Miller, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 14/630,209

(22) Filed: Feb. 24, 2015

(65) Prior Publication Data

US 2016/0247339 A1    Aug. 25, 2016

(51) Int. Cl.
*G07C 9/00* (2006.01)
*B60R 25/24* (2013.01)

(52) U.S. Cl.
CPC .......... *B60R 25/24* (2013.01); *G07C 9/00174* (2013.01); *G07C 9/0069* (2013.01); *G07C 2009/00793* (2013.01); *G07C 2209/04* (2013.01); *G07C 2209/08* (2013.01)

(58) Field of Classification Search
CPC ............ G07C 9/00007; G07C 9/00126; G07C 2009/00793; G07C 2209/04; G07C 2209/08; G07C 9/00174; G07C 9/0069; B60R 25/24
See application file for complete search history.

(56) References Cited

U.S. PATENT DOCUMENTS

| | | | |
|---|---|---|---|
| 5,467,070 A | 11/1995 | Drori et al. | |
| 8,154,383 B2* | 4/2012 | Brombach | G07C 9/00309 340/5.72 |
| 9,160,838 B2* | 10/2015 | Fry | B60R 25/24 |

(Continued)

FOREIGN PATENT DOCUMENTS

| | | |
|---|---|---|
| EP | 2703236 A1 | 8/2013 |
| WO | 03002387 A1 | 1/2003 |

OTHER PUBLICATIONS

Essex Electronics Inc., "KE-1601 User Guide, The Worry-Free Keyless Entry® System." 1-800-KEYLESS, keyless.com. (4 pages). Date unknown, last accessed from http://www.keyless.com/PDF/KE1601UsersGuide.pdf on Feb. 24, 2015.

*Primary Examiner* — Sisay Yacob
(74) *Attorney, Agent, or Firm* — Franklin A. MacKenzie; Brooks Kushman P.C.

(57) ABSTRACT

A vehicle includes a controller, in communication with a vehicle keypad and at least one key fob authorized to access the vehicle. The controller may be configured to enter a keypad programming mode responsive to receipt of a predefined sequence including button presses of fob controls of the at least one key fob; receive a personal code entered to the keypad; and store the personal code for comparison with keypad input of a user requesting to unlock the vehicle. The controller may also receive input to the keypad; and provide keypad access to vehicle unlock functionality when the input matches a personal code stored to the controller during a (Continued)

keypad programming mode previously entered responsive to receipt of a predefined sequence including button presses of fob controls of the at least one key fob.

18 Claims, 6 Drawing Sheets

(56) References Cited

U.S. PATENT DOCUMENTS

| | | | |
|---|---|---|---|
| 2005/0140496 A1* | 6/2005 | Magner | G07C 9/00674 340/5.54 |
| 2006/0238337 A1* | 10/2006 | Minassian | G08B 25/10 340/539.23 |
| 2008/0228365 A1 | 9/2008 | White et al. | |
| 2008/0318598 A1* | 12/2008 | Fry | B60R 25/24 455/456.5 |
| 2009/0273434 A1* | 11/2009 | Brombach | G07C 9/00309 340/5.2 |
| 2012/0209454 A1 | 8/2012 | Miller et al. | |
| 2012/0252365 A1* | 10/2012 | Lam | G07C 9/00309 455/41.2 |

* cited by examiner

KEY FOB BUTTON SEQUENCE FOR ACCESSING KEYPAD REPROGRAMMING MODE

TECHNICAL FIELD

The embodiments described herein generally relate to a system and method for use of a key fob or other device-entered sequence to replace a factory key code for accessing a keypad reprogramming mode.

BACKGROUND

Keypads are generally positioned on the exterior of a vehicle and are used to lock and unlock the vehicle (among other features). The driver may unlock the door with the keypad in response to successfully inputting a factory code (a code which includes a sequence of numbers or other such characters) on the keypad. Such keypads allow the driver to unlock/lock the door without the use of a key. Generally, the keypad is electrically coupled to an electronic controller. The controller controls a mechanism to unlock/lock the vehicle in response to the factory code inputted by the driver via the keypad. Other such keyless entry systems may include remote frequency based transmitters operably coupled to the electronic controller. The electronic controller is configured to unlock/lock the doors of the vehicle in response to receiving RF encoded signals from the transmitters.

A customer may use the factory code to program a new code (or personalized code) which may be easier to remember in order to unlock the vehicle with the keypad. The customer is generally given a plastic card which includes the factory code printed thereon upon purchasing the vehicle. Often times, such cards are misplaced and/or lost. In the event the driver wants to use his/her keypad or intends to configure the keypad, such as changing the unlock code to a code that is personal to the driver, the driver may need the factory code to modify the unlock code. Such a task may be difficult to perform if the card is misplaced or lost. To obtain the original factory code if the card is misplaced or lost or not turned over to the new owner of the vehicle, the driver is forced to go to a vehicle dealership to obtain the factory code. Technicians at the dealership may electronically retrieve the code from an electronic controller via a diagnostic tool or retrieve the code printed on the module label (part removal may be necessary).

The key code cards used in connection with the keypad feature add complexity and an unnecessary expense for vehicle manufacturers. For example, while the piece cost for each card is low, the total cost associated with providing such cards for a large number of vehicles may be significant. The complexity is seen in production and service end items as well as assembly plant and service handling procedures. The cards are generally shipped into vehicle assembly plants with the electronic controller and a number of radio transmitters (or key fobs). In general, the key fobs and the cards are bundled together and placed in a bag and coupled to the controller with tape or other such temporary restraint mechanism. While installing the electronic controller to the vehicle, an operator may be required to separate the bag containing the card and the key fobs.

SUMMARY

In a first illustrative embodiment, a vehicle includes a controller, in communication with a vehicle keypad and at least one key fob authorized to access the vehicle, configured to enter a keypad programming mode responsive to receipt of a predefined sequence including button presses of fob controls of the at least one key fob; receive a personal code entered to the keypad; and store the personal code for comparison with keypad input of a user requesting to unlock the vehicle.

In a second illustrative embodiment, a computer-implemented method includes unlocking a vehicle door, by a vehicle controller, in response to a personal code entered via a vehicle keypad, the personal code previously stored by the vehicle controller in communication with the vehicle keypad and a key fob authorized to access the vehicle in response to a predefined sequence received by the vehicle controller from at least one of the key fob and the vehicle keypad.

In a third illustrative embodiment, a vehicle includes a controller, in communication with a vehicle keypad and at least one key fob authorized to access the vehicle, configured to receive input to the keypad; and provide keypad access to vehicle unlock functionality when the input matches a personal code stored to the controller during a keypad programming mode previously entered responsive to receipt of a predefined sequence including button presses of fob controls of the at least one key fob.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

To avoid issues with factory codes, an improved keypad programming system may be configured to allow a user to enter a keypad programming mode using the user's remote key fob for the vehicle. Instead of entering the factory code, the user may instead enter a sequence of button presses using his remote key fob (e.g., LOCK, UNLOCK, LOCK, UNLOCK). The sequence may include different button presses than the given example, although it may be desirable for a sequence not to include two consecutive LOCK button presses as that action may sound the vehicle horn. The controller may identify the correct sequence of button presses, and transition the keypad into programming mode to allow the user to program a personal code. Accordingly, as the key fob may be used to enter programming mode, the factory code may be removed from the controller and the key code card may be omitted.

Variations on the possible sequence of button presses are possible. As some examples, the sequence may be of a shorter or longer length (e.g., 3 button presses, 5 button presses, etc.). Or, the sequence may include a long press of a button, such as holding the lock or unlock button on the key fob for five seconds. As another possibility, the system may require the user to utilize multiple key fobs to enter the sequence. For instance, the system may recognize a user pressing unlock once on each of two key fobs as the sequence to transition into programming mode.

As some further possibilities for passive entry equipped vehicles, the sequence may instead be based on key fob positioning using proximity sensors of the passive entry system. For instance, programming mode may be entered by placing one key fob in the vehicle center pocket, or by placing one key in the vehicle and a second key outside the vehicle. Or, programming mode may be entered by a sequence including touching a capacitive door handle. For instance the sequence may include the user touching the door handle a predetermined number of times within a time period (e.g., touch the door handle three times within an eight second window while having the key fob), or touching the driver's door handle, then a keypad button, then the door handle again to enter programming mode.

To provide further security to the reprogramming mode, the controller may be configured to disable entry into the programming mode when the vehicle is in valet mode. This would accordingly prevent an unauthorized person having possession of the key fob and the vehicle from adding their own personal code on the vehicle.

Figure 1:
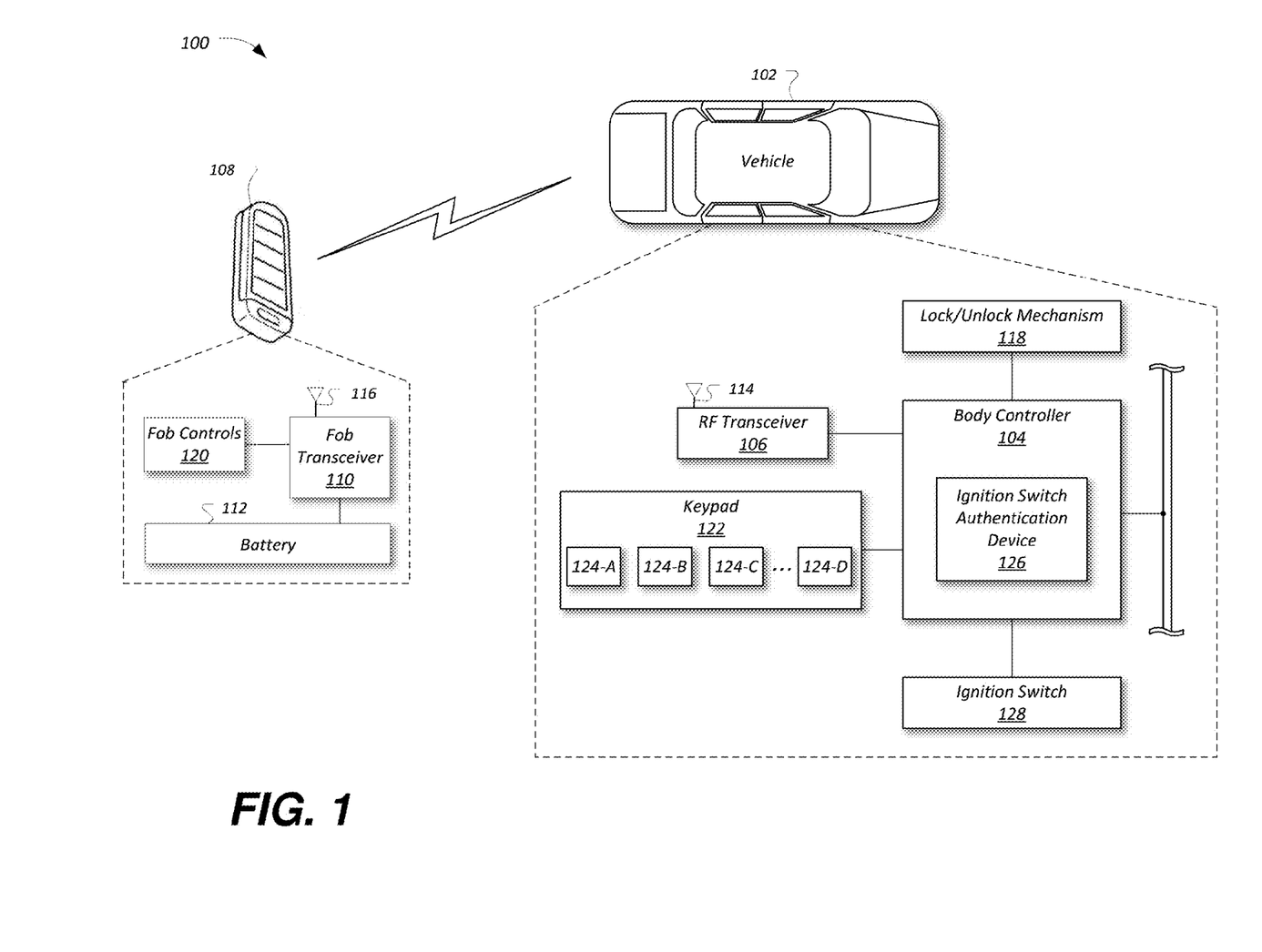
FIG. 1 illustrates an example keyless entry system for a vehicle.

FIG. 1 illustrates an example keyless entry system 100 for a vehicle 102. The system 100 may include a body controller 104 having a radio frequency (RF) transceiver 106. A key fob 108 may be in communication with the RF transceiver 106 of the controller 104 utilizing a fob transceiver 110 powered by a battery 112. An antenna 114 of the RF transceiver 106 may receive RF signals from an antenna 116 of the fob transceiver 110, and may deliver the signals to the RF transceiver 106. An unlock/lock mechanism 118 is operably coupled to the controller 104. The controller 104 is configured to control the unlock/lock mechanism 118 to unlock/lock doors of the vehicle 102 in response to the RF signals transmitted by the key fob 108. The key fob 108 may include one or more fob controls 120, such as a lock switch and an unlock switch. Accordingly, the controller 104 controls the unlock/lock mechanism 118 to lock the doors of the vehicle 102 in response to a user depressing a lock fob control 120 of the key fob 108, and to unlock the doors of the vehicle 102 in response to the user depressing an unlock fob control 120 of the key fob 108.

A keypad 122 is in electrical communication with the controller 104. The keypad 122 may be positioned on an exterior portion or section of the vehicle 102. In one example, the keypad 122 may be hardwired to the controller 104. In another example, the keypad 122 may be in RF communication with the controller 104 (e.g., via the RF antenna 114). The keypad 122 includes a plurality of switches 124a-124n which correspond to numeric characters, alpha characters or any combination of alpha-numeric characters. An example keypad may be the SECURICODE keypad provided on certain vehicles produced by FORD MOTOR COMPANY, INC., having five switches 124, such that the first switch 124a specifies digits '1-2', the second switch 124b specifies digits '3-4', the third switch 124c specifies digits '5-6', the fourth switch 124d specifies digits '7-8', and the fifth switch 124e specifies digits '9-0'.

In an example, the keypad 122 may transmit commands via hardwired signals to the controller 104 which correspond to a sequence of numeric characters, alpha characters, or alpha-numeric characters in response to the user selecting various switches 124a-124n. In another example, the keypad 122 may transmit commands via RF signals which correspond to the alpha, numeric, or alpha-numeric characters to the controller 104 in response to the user selecting various switches 124a-124n. The controller 104 controls the unlock/lock mechanism 118 to unlock/lock the doors in response to receiving the commands, e.g., two or more signals (RF or hardwired) which correspond to a valid sequence of alpha, numeric, or alpha-numeric characters.

The key fob 108 may be implemented in connection with a base remote entry system, a passive entry passive start (PEPS) system or a passive anti-theft system (PATS). With the PEPS system, the controller 104 may control the unlock/lock mechanism 118 to unlock the door in response to the controller 104 determining that the key fob 108 is a predetermined distance away from the vehicle 102. In such a case, the key fob 108 automatically (or passively) transmits encrypted RF signals (e.g., without user intervention) in order for the controller 104 to decrypt (or decode) the RF signals and to determine if the key fob 108 is within the predetermined distance and are authorized. It is to be noted that with the PEPS implementation, the key fob 108 also generate RF signals which correspond to encoded lock/unlock signals in response to a user depressing a lock fob control 120 or an unlock fob control 120. In addition, with the PEPS system, a key may not be needed to start the vehicle 102. The user in this case may be required to depress the brake pedal switch or perform some predetermined operation prior to depressing a start switch after the user has entered into the vehicle 102. In the PATS implementation, the key fob 108 may operate as a conventional key fob in order to unlock/lock the vehicle 102. With the PATS implementation, a keys (not shown) is generally needed to start the vehicle 102. The key may include a RF transmitter embedded therein to authenticate the key to the vehicle 102.

The controller 104 includes an ignition switch authentication device 126. The ignition switch authentication device 126 may also include an RF receiver (not shown) and an antenna (not shown) for receiving RF signals transmitted by the RF transmitters of the keys. It should be noted that the ignition switch authentication device 126 may be implemented as a standalone controller (or module). The ignition switch authentication device 126 is configured to authenticate the particular type of mechanism used to start the vehicle 102. For example, with the PATS implementation, the key is inserted into an ignition switch 128 to start the vehicle 102. In such a case, the RF transmitter of the key transmits RF signals having encrypted data therein to the receiver of the ignition switch authentication device 126. The ignition switch authentication device 126 decrypts the data to authenticate the key prior to allowing the user to start the vehicle 102.

With the PEPS implementation, as noted above, a key is not needed to start the vehicle 102. In such a case, the ignition switch authentication device 126 authenticates the RF encrypted data passively transmitted by the transmitter 108a-108n to allow the user to start the engine of the vehicle 102. As noted above, in addition to the authentication device 126 authenticating the RF encrypted data, the user may perform a predetermined operation (e.g., pull handle of a door, or open door, toggle the brake pedal switch, or other operation) prior to depressing a start switch to start the vehicle 102. The system 100 contemplates a number of other operations from those listed prior to depressing the start switch to start the vehicle 102.

Figure 2A:
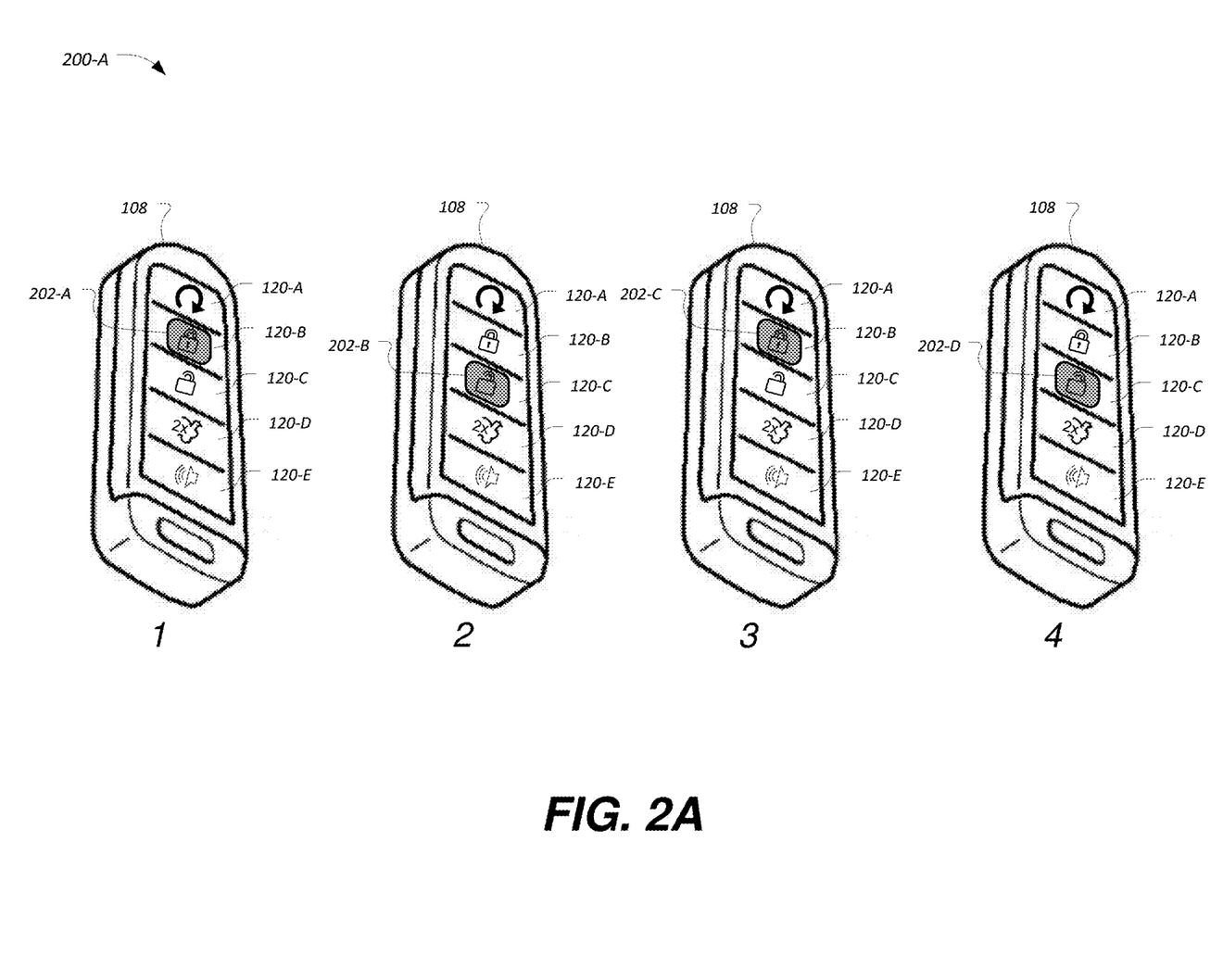
FIG. 2A illustrates an example sequence entered using the key fob to enter programming mode.

FIG. 2A illustrates an example sequence 200-A entered using the key fob 108 to enter programming mode. As shown, the example key fob 108 includes a remote start fob control 120-A, a lock fob control 120-B, an unlock fob control 120-C, a trunk unlock fob control 120-D, and an alarm fob control 120-E. The sequence 200-A may include a set of button presses 202 of the one or more fob controls 120-A through 120-E (collectively 120) that a user may enter using the key fob 108. As shown, the sequence includes four button presses (e.g., lock 202-A, unlock 202-B, lock 202-C, and unlock 202-D). The controller 104 may maintain information indicative of the sequence 200, and may use the stored sequence 200 information to identify whether the correct sequence 200 of button presses 202 is input. If the correct sequence 200 is entered, the controller 104 may transition the keypad 122 into the programming mode. It may be desirable for a sequence 200 not to include two consecutive LOCK button presses 202, as that action may sound the vehicle 102 horn.

Variations on the possible sequence 200 of button presses are possible. As some examples, the sequence 200 may be of a shorter or longer length (e.g., 3 button presses, 5 button presses, etc.). Or, the sequence 200 may include a long press of a button, such as holding the lock or unlock button on the key fob 108 for a predetermined amount of time (e.g., three seconds, five seconds, seven seconds, etc.).

Figure 2B:
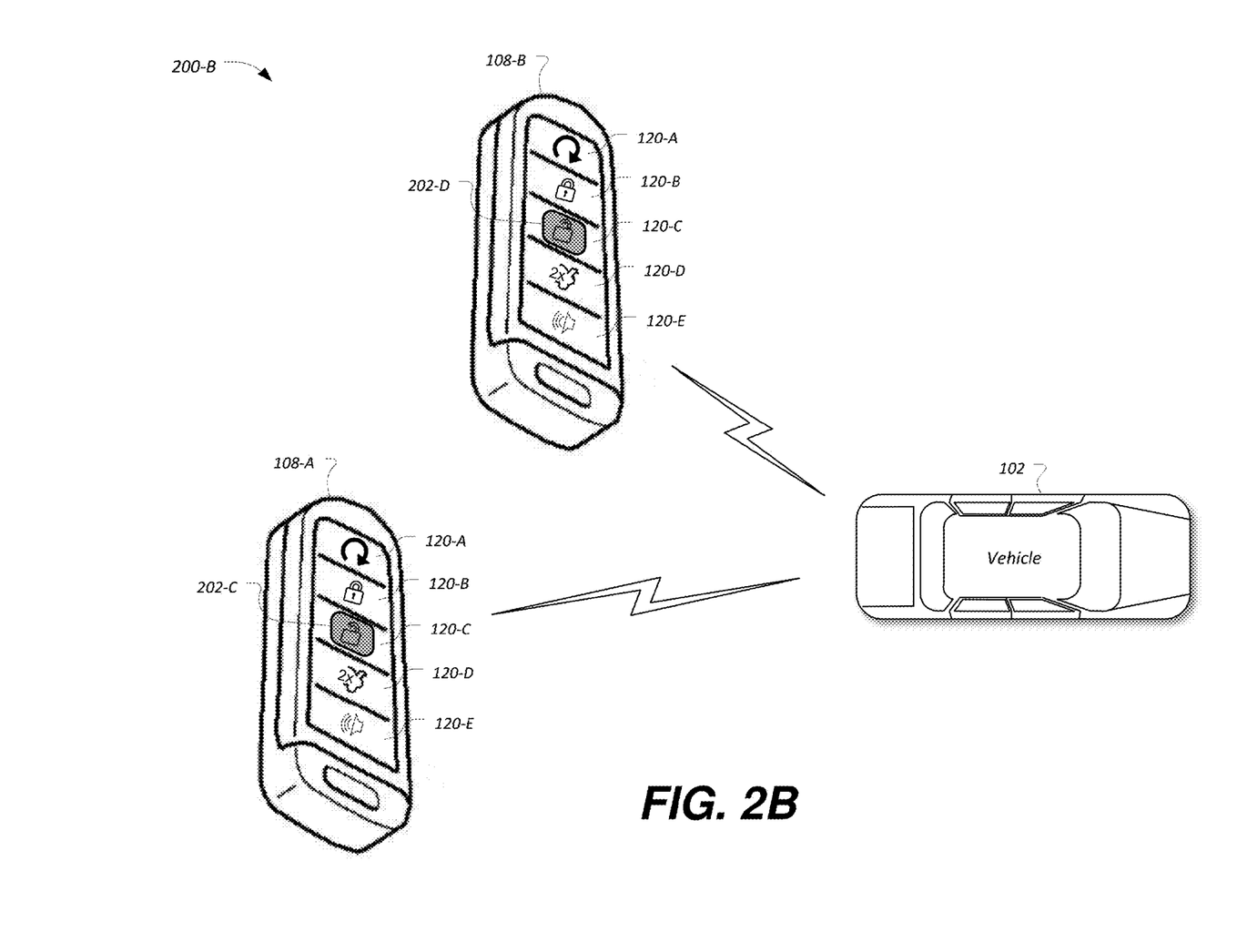
FIG. 2B illustrates an example sequence entered using multiple key fobs to enter programming mode.

As another possibility, as shown in FIG. 2B, the system may require the user to utilize multiple key fobs 108 to enter the sequence 200-B. For instance, the system 100 may recognize a user pressing unlock once on each of two key fobs 108 (e.g., unlock 202-C on key fob 108-A, and unlock 202-D on key fob 108-B) as the sequence 200 to transition into programming mode.

Figure 2C:
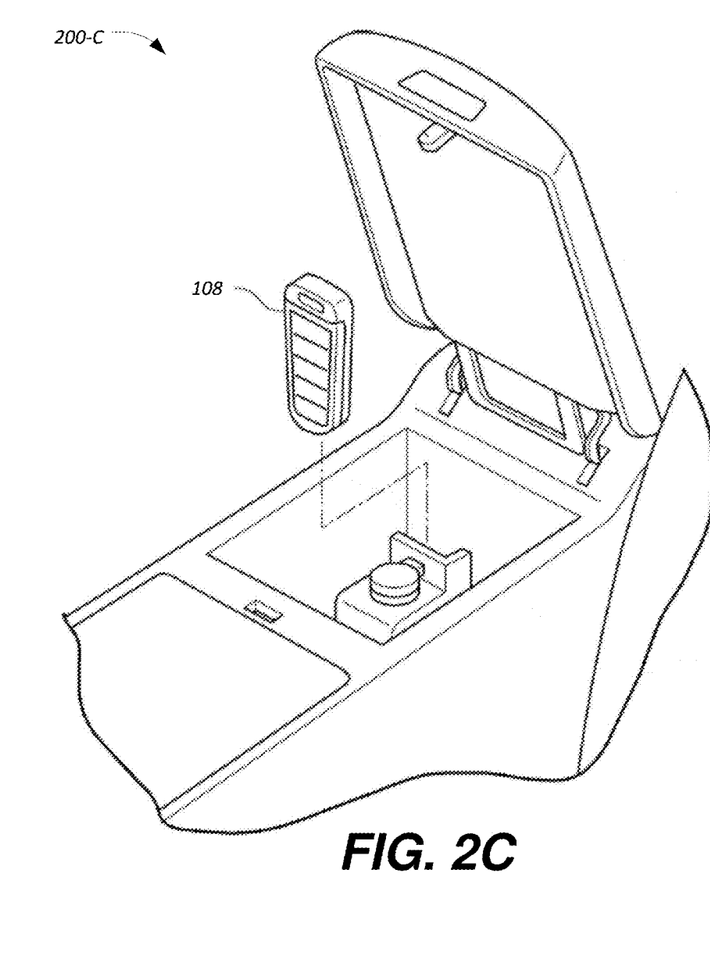
FIG. 2C illustrates an example sequence including placing the key fob in a center pocket to enter programming mode.

As some further possibilities for passive entry equipped vehicles 102, the sequence 200 may instead be based on key fob 108 positioning using proximity sensors of the passive entry system. For instance, programming mode may be entered by placing one key fob 108 in the vehicle 102 center pocket (e.g., as shown in FIG. 2C), or by placing one key fob 108 in the vehicle 102 and a second key fob 108 outside the vehicle 102 (not shown). Or, programming mode may be entered by a sequence 200 including touching a capacitive door handle (also not shown). For instance the sequence 200 may include the user touching the door handle a predetermined number of times within a time period (e.g., touch the door handle three times within an eight second window while having the key fob 108), or touching the driver's door handle, then a keypad button, then the door handle again to enter programming mode.

Once in programming mode, the controller may allow the user to program a personal code. For example, the user may input the sequence 200 via the key fob 108 and then input the personalized code within a predetermined time frame to generate and store the personalized code in the controller 104. To unlock the door after the personalized code is setup, the controller 104 may use the personalized code stored therein for comparison to signals received from the keypad 122 to determine if the correct code (e.g., the personalized code) was input by the user prior to unlocking the vehicle 102.

Accordingly, as the key fob 108 may be used to enter programming mode, the factory code may be removed from the controller 104 and the key code card may be omitted. In another example, the factory code may remain in the controller 104 as another option for allowing the user to transition into the programming mode. In such an example, a driver may utilize the factory code to set up the personalized code, which is easier to remember to unlock the vehicle 102 than the factory code. For example, the user may input the factory code via the keypad 122 and then input the personalized code within a predetermined time frame to generate and store the personalized code in the controller 104.

Variations on the use of the sequence 200 to enter the programming mode are possible. In an example, use of the sequence 200 to enter the programming mode may be disabled when the vehicle 102 is in valet mode. Valet mode may refer to a mode in which access to personal vehicle 102 information and certain vehicle 102 settings may be disabled until a passcode (e.g., a 4 digit pin) programmed to the vehicle 102 is re-entered into the vehicle 102. Thus, entrance of the passcode to exit valet mode may be required by the controller 104 to provide an additional level of security for use of the key fob 108 to enter programming mode. This would accordingly prevent an unauthorized person having possession of the key fob 108 and the vehicle 102 from adding their own personal code on the vehicle 102.

Figure 3:
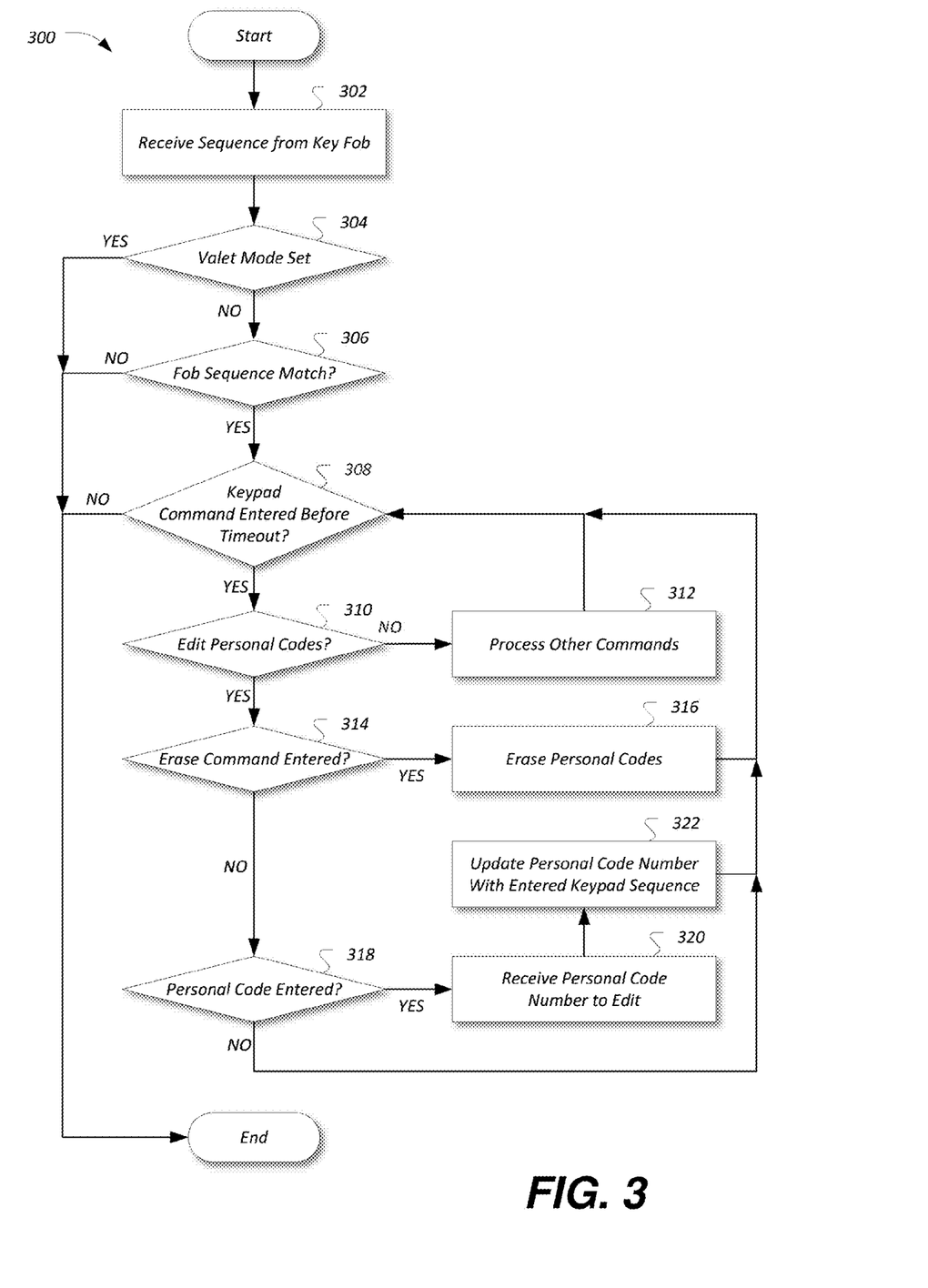
FIG. 3 illustrates an example process for setting a personal code for the vehicle using the sequence.

FIG. 3 illustrates an example process 300 for setting a personal code for the vehicle 102 using the sequence 200. The process 300 may be performed, in an example, by the controller 104 in communication with the key fob 108 and keypad 122.

At operation 302, the controller 104 receives a sequence 200 including input from the key fob 108. In an example, the sequence 200 may be entered into the key fob 108 using the one or more fob controls 120 of the key fob 108, and transmitted from the fob transceiver 110 to the RF transceiver 106 of the vehicle 102, and provided to the controller 104. As some other examples, the sequence 200 may be entered using multiple key fobs 108 or according to key fob 108 locations, or by touching vehicle 102 capacitive PEPS door handles, pillar sensors, or other capacitive vehicle sensors when the key fob 108 is in capacitive sensor proximity.

At operation 304, the controller 104 determines whether valet mode is set. In an example, the controller 104 may maintain state information intuitive of whether the vehicle 102 is in value mode. When in valet mode, the controller 104 may decline entry into programming mode via the key fob 108. Thus, if the controller 104 accesses the state information and identifies that the vehicle 102 is in valet mode, the process 300 ends. Otherwise, control passes to operation 306.

At operation 306, the controller 104 determines whether the sequence 200 matches a predetermined sequence 200. In an example, the controller 104 may maintain information indicative of the sequence 200, and may use the stored sequence 200 information to identify whether the correct sequence 200 of button presses 202 is input. One example sequence 200 is discussed above with respect to FIG. 2. If the entered sequence 200 is correct, control passes to operation 308. Otherwise, the process 300 ends.

At operation 308, the controller 104 determines whether a command was entered from the keypad 122 before a predetermined keypad 122 timeout. In an example, the command may be entered into the keypad 122 using the plurality of switches 124 of the keypad 122, and transmitted from the keypad 122 to the controller 104 via a wired or wireless connection. The keypad 122 timeout value may be, for example, five seconds. If the user entered a command before the timeout, control passes to operation 310. Otherwise the process 300 ends.

At operation 310, the controller 104 determines whether the edit personal codes command was entered. In an example, the user may select the '1-2' switch 124 of the keypad 122 to enter a personal code entry mode. If the user selected personal code entry mode, control passes to operation 314. Otherwise control passes to operation 312 to process other commands unrelated to editing of personal codes. While the processing of other commands is not discussed in detail here, after operation 312, control may pass back to operation 308.

At operation 314, the controller 104 determines whether the erase personal codes command was entered. In an example, if the user holds the '1-2' switch 124 of the keypad 122 down for a predetermined amount of time (e.g., two seconds) before the keypad 122 timeout value (e.g., five seconds) of having received the edit personal codes command at operation 308, control passes to operation 316. Otherwise, control passes to operation 318.

At operation 316, the controller 104 erases the personal codes. In an example, all personal codes previously set up may be erased, and a new personal code would be required to be set up to use the keypad 122 for keyless entry. After operation 316, control passes to operation 308.

At operation 318, the controller 104 determines whether a new personal code was entered. In an example, if the user enters a personal code using the switches 124 of the keypad 122, such that each element of the sequence is entered within a keypad 122 timeout value (e.g., five seconds) of the previous element of the sequence, control passes to operation 320. Otherwise, control passes to operation 308.

At operation 320, the controller 104 receives a personal code number to edit. In an example, the user may select the '1-2' switch 124 of the keypad 122 to save the new personal code as code number one, the '3-4' switch 124 of the keypad 122 to save the new personal code as code number two, the '5-6' switch 124 of the keypad 122 to save the new personal code as code number three, the '7-8' switch 124 of the keypad 122 to save the new personal code as code number four, and the '9-0' switch 124 of the keypad 122 to save the new personal code as code number five.

At operation 322, the controller 104 updates the personal code number with the entered keypad 122 sequence. In an example, the controller 104 may maintain the set personal codes on a memory of the controller 104. Once set, any of the personal codes may be used to access the vehicle 102, as discussed in further detail with respect to the process 400. After operation 322, control passes to operation 308 to perform additional operations, or to end the process 300 upon the timeout.

Figure 4:
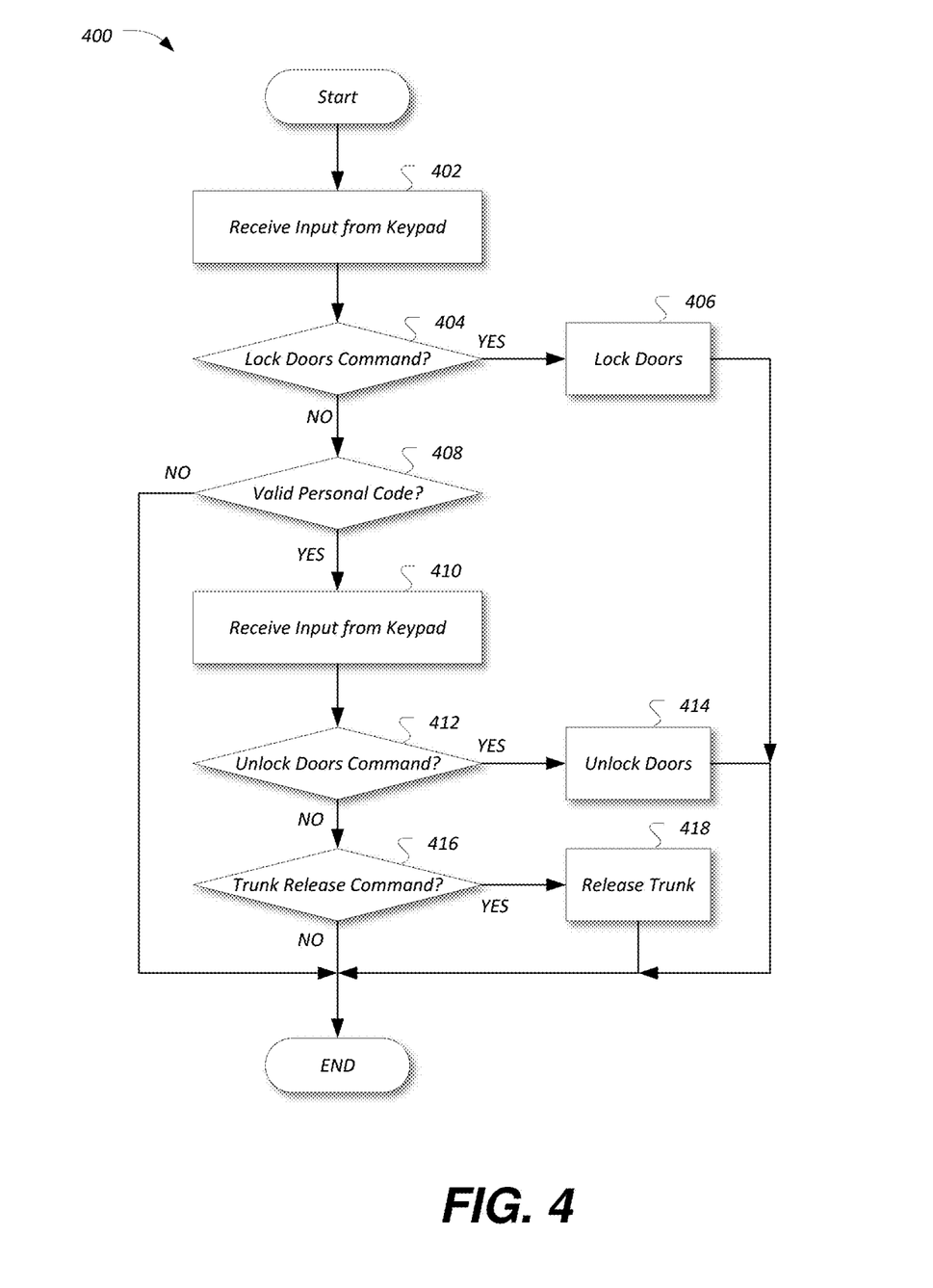
FIG. 4 illustrates an example process for utilizing the personal code to unlock the vehicle.

FIG. 4 illustrates an example process 400 for utilizing the personal code to unlock the vehicle 102. Similar to the process 300, the process 400 may be performed by the controller 104 in communication with the keypad 122.

At operation 402, the controller 104 receives input from the keypad 122. In an example, the input may be entered into the keypad 122 using the plurality of switches 124 of the keypad 122, and transmitted from the keypad 122 to the controller 104 via a wired or wireless connection.

At operation 404, the controller 104 determines whether a lock doors command was input to the keypad 122. In an example, the lock doors command may be specified by a user pressing and holding '7-8' and '9-0' switches 124 of the keypad 122. As shown, the lock doors command may be entered without a user having to enter a personal code, but it should be noted that in other examples the personal code may be required for the lock command. If the lock doors command is input, control passes to operation 406.

At operation 406, the controller 104 locks the vehicle 102 doors. In an example, the controller 104 may command the unlock/lock mechanism 118 to lock the doors of the vehicle 102. After operation 406, the process 400 ends.

At operation 408, the controller 104 determines whether a personal code was input to the keypad 122. In an example, the controller 104 may determine wither the input matches a previously set up personal code. Personal codes may be set up, for example, as discussed above with respect to the process 300. If a personal code is entered, control passes to operation 410. Otherwise, the process 400 ends.

At operation 410, the controller 104 receives input from the keypad 122. In an example, once authenticated using the personal code, the user may enter a command to be performed by the vehicle 102.

At operation 412, the controller 104 determines whether an unlock doors command was input to the keypad 122. In an example, the unlock doors command may be specified by a user pressing the '3-4' switch 124 of the keypad 122 within the keypad 122 timeout period of entering the personal code. If the unlock doors command was entered, control passes to operation 414. Otherwise, control passes to operation 416.

At operation 414, the controller 104 unlocks the vehicle 102 doors. In an example, the controller 104 may command the unlock/lock mechanism 118 to unlock the doors of the vehicle 102. After operation 414, the process 400 ends.

At operation 416, the controller 104 determines whether a trunk release command was input to the keypad 122. In an example, the trunk release command may be specified by a user pressing the '5-6' switch 124 of the keypad 122 within the keypad 122 timeout period of entering the personal code. If the unlock doors command was entered, control passes to operation 416. Otherwise, the process 400 ends.

At operation 418, the controller 104 releases the vehicle 102 trunk latch. In an example, the controller 104 may command the unlock/lock mechanism 118 to release the trunk latch of the vehicle 102. After operation 414, the process 400 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a controller, in communication with a vehicle keypad and at least one key fob authorized to access the vehicle, configured to
      enter a keypad programming mode responsive to receipt of a predefined sequence including button presses of fob controls of the at least one key fob;
      receive a personal code entered to the keypad while in the keypad programming mode; and
      store the personal code for comparison with keypad input requesting to unlock the vehicle received after exiting the keypad programming mode;
   wherein the at least one key fob includes a first key fob and a second key fob, and the predefined sequence includes a button press from a first fob control located on the first key fob and a second button press of a second fob control located on the second key fob.

2. The vehicle of claim 1, wherein the predefined sequence includes a button press from one of the at least one key fob and a button press of the vehicle keypad.

3. The vehicle of claim 1, wherein the controller is further configured to:
validate whether the vehicle is in a valet mode in which access is disabled to at least one of a subset of vehicle information and a subset of vehicle settings; and
when in the valet mode, prevent receipt of the predefined sequence from transitioning the vehicle into the keypad programming mode.

4. The vehicle of claim 3, wherein the controller is further configured to transition out of valet mode responsive to input via the keypad of a passcode programmed to the vehicle when transitioning the vehicle into valet mode.

5. The vehicle of claim 1, wherein the fob controls include a lock control and an unlock control, and the predefined sequence includes a press of the lock control, followed by a press of the unlock control, followed by a press of the lock control, followed by a press of the unlock control.

6. The vehicle of claim 1, wherein the controller is further configured to:
maintain a factory code installed to the controller upon manufacture;
receive input from the keypad to enter the keypad programming mode; and
enter the keypad programming mode responsive to receipt of the factory code via the keypad.

7. The vehicle of claim 1, wherein the controller is further configured to delete or replace a factory code installed to the controller upon manufacture by a subsequently entered personal code.

8. A method comprising:
unlocking a door of a vehicle, by a vehicle controller communicating with a vehicle keypad and a key fob authorized to access the vehicle, responding to a personal code entered via the vehicle keypad, the personal code previously stored by the controller during a keypad programming mode entered responsive to receiving a predefined sequence including a button press from the key fob and a second button press from a second key fob.

9. The method of claim 8, further comprising:
validating whether the vehicle is in a valet mode in which access is disabled to at least one of a subset of vehicle information and a subset of vehicle settings; and
when in valet mode, preventing receipt of the predefined sequence from transitioning the vehicle into the keypad programming mode.

10. The method of claim 9, further comprising transitioning out of valet mode responsive to input via the keypad of a passcode programmed to the vehicle when transitioning the vehicle into valet mode.

11. The method of claim 8, wherein the key fob includes fob controls including a lock control and an unlock control, and the predefined sequence includes a press of the lock control, followed by a press of the unlock control, followed by a press of the lock control, followed by a press of the unlock control.

12. The method of claim 8, further comprising:
maintaining a factory code installed to the controller upon manufacture;
receiving input from the keypad to enter the keypad programming mode; and
entering the keypad programming mode responsive to receipt of the factory code via the keypad.

13. The method of claim 8, further comprising not maintaining a factory code installed to the controller upon manufacture.

14. The method of claim 8, further comprising:
receiving keypad input from a user requesting to unlock the vehicle; and
providing keypad access to vehicle unlock functionality to the user when the keypad input matches the personal code.

15. A vehicle comprising:
a controller, in communication with a vehicle keypad and at least one key fob authorized to access the vehicle, configured to
receive input to the keypad; and
provide keypad access to vehicle unlock functionality when the input matches a personal code stored to the controller during a keypad programming mode previously entered responsive to receipt of a predefined sequence including button presses of fob controls of the at least one key fob,
wherein the at least one key fob includes a first key fob and a second key fob, and the predefined sequence includes a button press from the first key fob and a second button press from the second key fob.

16. The vehicle of claim 15, wherein the controller is further configured to:
maintain a factory code installed to the controller upon manufacture; and
provide for entering the keypad programming mode responsive to receipt of the factory code via the keypad.

17. The vehicle of claim 15, wherein the controller is further configured to:
validate whether the vehicle is in a valet mode in which access is disabled to at least one of a subset of vehicle information and a subset of vehicle settings; and
when in valet mode, prevent receipt of the predefined sequence from transitioning the vehicle into the keypad programming mode.

18. The vehicle of claim 15, wherein the controller is further configured to provide keypad access to vehicle lock functionality regardless of whether the personal code is entered.

* * * * *